(12) United States Patent
Planer

(10) Patent No.: US 9,603,450 B2
(45) Date of Patent: Mar. 28, 2017

(54) STATIONARY RESTRAINT SYSTEM FOR POLICE STRUCTURES

(71) Applicant: Matthew J. Planer, Sinking Spring, PA (US)

(72) Inventor: Matthew J. Planer, Sinking Spring, PA (US)

(*) Notice: Subject to any disclaimer, the term of this patent is extended or adjusted under 35 U.S.C. 154(b) by 0 days.

(21) Appl. No.: 15/155,266

(22) Filed: May 16, 2016

(65) Prior Publication Data

US 2016/0278527 A1 Sep. 29, 2016

Related U.S. Application Data

(63) Continuation-in-part of application No. 14/485,907, filed on Sep. 15, 2014, now Pat. No. 9,340,180.

(60) Provisional application No. 61/878,447, filed on Sep. 16, 2013.

(51) Int. Cl.

| | |
|---|---|
| *A47C 1/00* | (2006.01) |
| *A47C 7/00* | (2006.01) |
| *A47B 91/08* | (2006.01) |
| *A47C 7/62* | (2006.01) |
| *B60R 22/00* | (2006.01) |

(52) U.S. Cl.
CPC ............... *A47C 1/00* (2013.01); *A47B 91/08* (2013.01); *A47C 7/004* (2013.01); *A47C 7/62* (2013.01); *B60R 22/00* (2013.01); *B60R 2022/003* (2013.01)

(58) Field of Classification Search
CPC .... A47C 1/00; A47C 7/04; A47C 7/62; A47C 7/38; A47C 7/004; A47B 91/08; B60R 22/20; B60R 2022/003

USPC ................................ 297/487, 488, 464, 466
See application file for complete search history.

(56) References Cited

U.S. PATENT DOCUMENTS

| | | | |
|---|---|---|---|
| 4,925,246 A | 5/1990 | Corcoran | |
| 4,995,672 A | 2/1991 | Corcoran | |
| 5,272,984 A * | 12/1993 | Bolliger | A63G 7/00 104/63 |
| 5,499,844 A * | 3/1996 | Dirck | B60R 21/02 280/748 |
| 5,529,382 A * | 6/1996 | Burkat | A63G 7/00 280/748 |
| 5,755,235 A | 5/1998 | Magiawala | |
| 6,637,341 B2 * | 10/2003 | Kroon | A63G 27/04 104/53 |
| 7,712,200 B2 | 5/2010 | Squires | |

(Continued)

*Primary Examiner* — Beth Stephan
(74) *Attorney, Agent, or Firm* — Miller Law Group, PLLC

(57) ABSTRACT

A supplemental restraint system that is mountable to the frame of a stationary structure, such as a police station or other building, to secure a prisoner in a seated position. The supplemental restraint system includes a restraint bar that is pivotally supported on the mounting plate for movement between a raised inoperative position and a lowered operative position. A locking mechanism secures the restraint bar in any selected lowered position and includes an actuation lever for selectively releasing the locking mechanism to permit the restraint bar to be raised for release of the prisoner. A spring mechanism biases the restraint bar toward a raised position so that the restraint bar can be moved upwardly while the police officer is outside of the police vehicle. Mounting plates can be utilized to secure the supplemental restraint system to the floor structure and an adjacent wall structure.

19 Claims, 9 Drawing Sheets

(56) References Cited

U.S. PATENT DOCUMENTS

| | | |
|---|---|---|
| 7,922,254 B2 | 4/2011 | Squires |
| 7,947,943 B2 * | 5/2011 | Jaskol ..................... B60R 22/48 188/2 D |
| 2002/0070599 A1 * | 6/2002 | Berra ...................... B60R 21/02 297/466 |
| 2010/0236444 A1 * | 9/2010 | Blonk .................... A63G 21/20 104/53 |
| 2012/0068521 A1 * | 3/2012 | Roodenburg ......... B60R 21/026 297/487 |

* cited by examiner

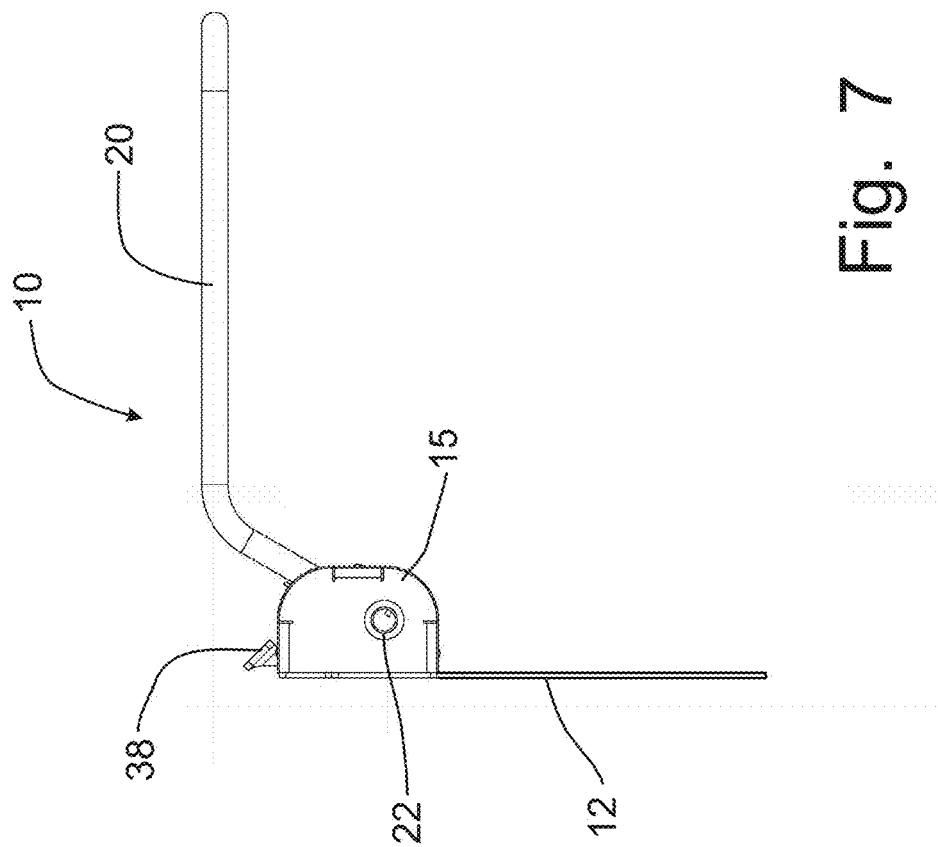
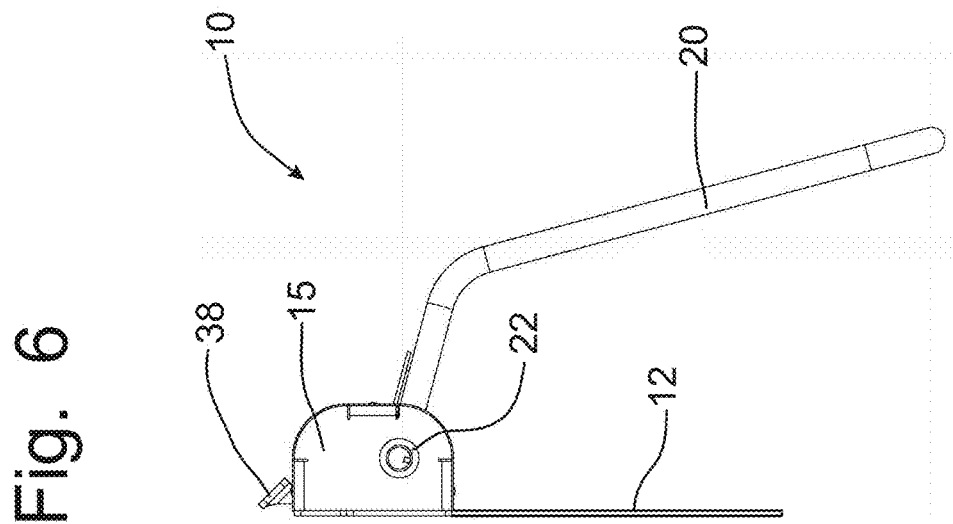

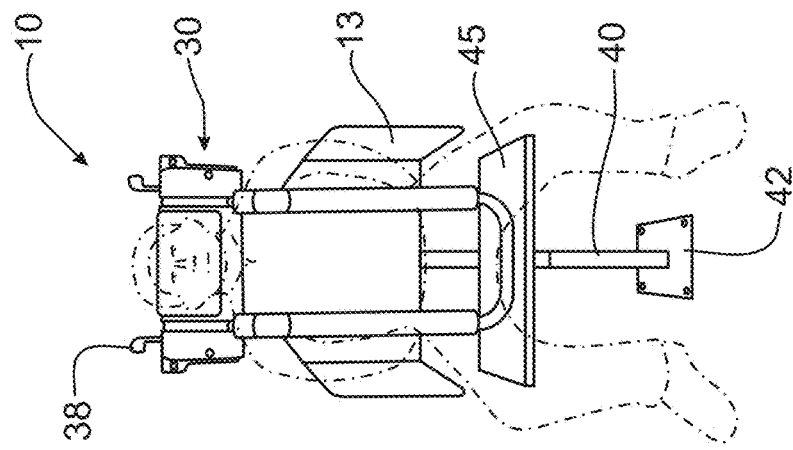
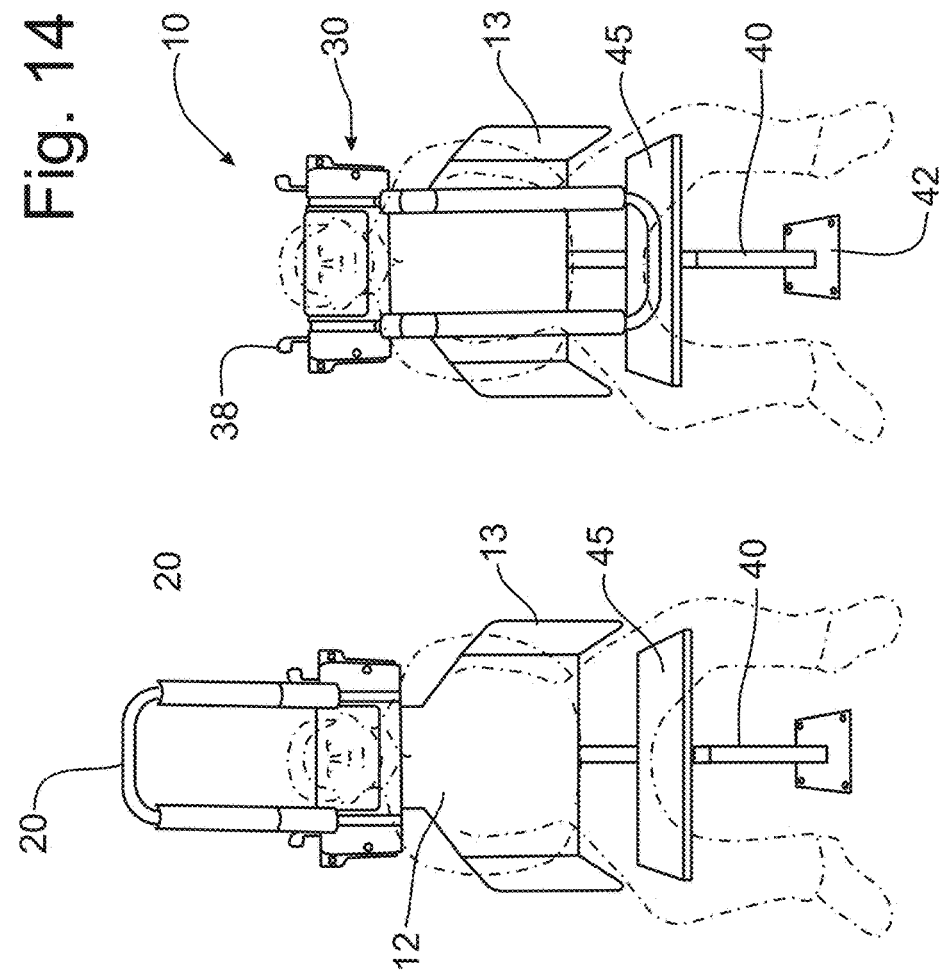
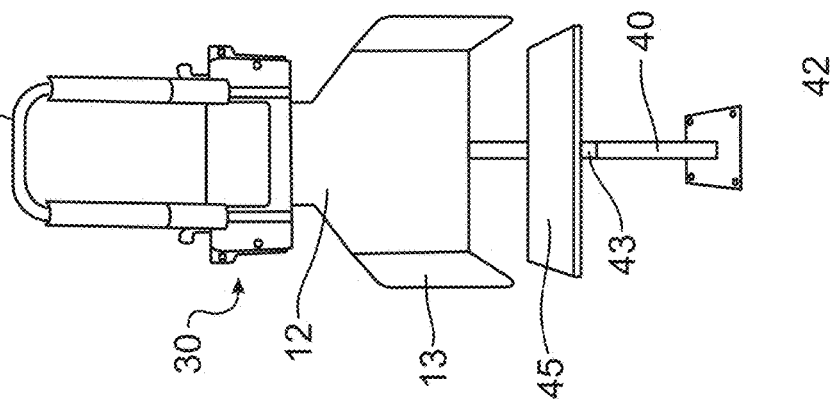

STATIONARY RESTRAINT SYSTEM FOR POLICE STRUCTURES

CROSS-REFERENCE TO RELATED APPLICATIONS

This application is a continuation-in-part of U.S. patent application Ser. No. 14/485,907, filed on Sep. 15, 2014, and granted as U.S. Pat. No. 9,340,180, on May 17, 2016, which claims domestic priority on U.S. Provisional Patent Application Ser. No. 61/878,447, filed on Sep. 16, 2013, the contents of which is incorporated herein.

FIELD OF THE INVENTION

The present invention relates generally to the restraint of people in custody while in a stationary structure, such as a police station, which device can also be utilized in a different configuration in the transportation of prisoners in the rear seat of a police car, and more particularly, to an easily operated restraint device that prevents handcuffed prisoners from unfastening the restraint system and moving from the restraint device.

BACKGROUND OF THE INVENTION

The rear seat of a police vehicle is configured for the transportation of prisoners. The conventional upholstered rear seats of an automobile vehicle are replaced by molded plastic seats that can be easily cleaned. Typically, handcuffed prisoners are placed into one of the molded plastic seat and secured by a seat belt, requiring the officer to reach across the handcuffed prisoner to reach the seat belt, pull the seat belt across the prisoner, and secure the seat belt hasp into the anchored latch. This procedure involves some risk for the officer, particularly when the prisoner is unruly, uncontrolled and/or sick. In addition, a handcuffed prisoner can reach the seat belt latch to cause the latch to release, which means that the prisoner would be unsecured in the rear seat and a safety concern.

One configuration of a molded plastic rear seat for a police vehicle is taught in U.S. Pat. No. 4,925,246, issued on May 15, 1990, and in U.S. Pat. No. 4,995,672, issued on Feb. 26, 1991, both to Dan E. Corcoran, and includes downwardly converging channels for receiving the arms of a handcuffed prisoner. U.S. Pat. No. 4,995,672 also teaches a seat belt restraint system for use with the molded contoured rear seat that includes an upper shoulder belt mounted in the sides of the vehicle that can be extended downwardly and across the handcuffed prisoner to be secured by a latch member anchored at the middle portion of the contoured seat.

A supplemental restraint system is disclosed in U.S. Pat. No. 7,712,200, granted on May 11, 2010, and in U.S. Pat. No. 7,922,254, granted on Apr. 12, 2011, both to Keith D. Squires, et al, in which a retractable strap is mounted behind a police vehicle seat to extend through the seat to be secured directly to the handcuffs of a prisoner being transported. Once the clasp is secured to the handcuffs, the strap is retracted to and locked into place to prevent the prisoner from moving out of the seat. When the prisoner is to be moved out of the seat, the locked retraction mechanism is released to allow the strap to be extended by the movement of the prisoner and the clasp released from the handcuffs.

Another form of a supplemental restraint mechanism for the transport of a prisoner is taught in U.S. Pat. No. 5,755,235, granted to Kiran B. Magiawala on May 26, 1998. In this supplemental restraint mechanism, the prisoner's feet are secured by a secondary belt located near the floor to secure the prisoner's feet and prevent the transported prisoner from kicking.

The temporary restraint of prisoners or people in custody of the police while in the police station or other stationary structure can also present a dangerous situation for both the person in custody and the police keeping the person in custody. An agitated person in custody handcuffed to a chair or other movable structure can be rocked, loosened or upset, during which both the person in custody and the people around that person can be injured. Accordingly, it would be desirable to provide a supplemental prisoner restraint system for use in a stationary structure to keep people in custody secure while waiting for processing or while being interviewed. It would also be desirable to permit a convenient release of the supplemental restraint system.

SUMMARY OF THE INVENTION

It is an object of this invention to overcome the disadvantages of the prior art by providing a supplemental prisoner restraint system that can be utilized in a stationary structure.

It is another object of this invention to provide a supplemental prisoner restraint apparatus that can be mounted to the wall and floor of a stationary structure, such as a police station.

It is a feature of this invention that the supplemental restraint system includes a pivotal restraint bar that is movable between a raised inoperative position and a lowered operative position.

It is an advantage of this invention that the supplemental restraint system operates independently of any other restraint devices, such as handcuffs to keep a person in custody in a safe and secure situation.

It is another feature of this invention that the restraint bar is freely movable from the raised inoperative to the lowered operative position.

It is another advantage of this invention that the restraint bar is locked from upward movement when placed into the lowered operative position.

It is still another feature of the invention that the supplemental prisoner restraint system has an actuation tab that can be accessed to allow the restraint bar to be selectively moved from the lowered operative position to the raised inoperative position for the release of the person in custody or prisoner from the supplemental restraint system.

It is yet another object of this invention that the supplemental restraint system that a different configuration of the supplemental restraint system can be incorporated into the molded rear seat insert member that is conventionally utilized on the rear seats of police cars.

It is still another feature of this invention that the actuation mechanism operable to release the restraint bar is located in a position that cannot be reached by a prisoner being restrained by the supplemental restraint system, but can be accessed conveniently by a police officer.

It is still another advantage of this invention that the supplemental restraint system is easily operable both to secure a prisoner and to release a prisoner.

It is an object of this invention that the supplemental restraint system can be utilized in an office setting where temporary restraint of a prisoner is desired.

It is yet another feature of this invention that the supplemental restraint system can be installed to any frame structure to provide a seating device to restrain a prisoner temporarily.

It is a further feature of this invention that the restraint bar is locked at any selected lowered position without requiring the restraint bar to be moved to a pre-selected position.

It is still a further advantage of this invention that the supplemental restraint system will adapt to the size of the prisoner being restrained through the pivotal downward movement of the restraining bar to a position that prevents the prisoner from moving out of the rear seat of the police vehicle, or other seating device.

It is a further object of this invention to provide a supplemental prisoner restraint system for use in a stationary structure to temporarily secure the prisoner in a seated position, in which the supplemental prisoner restraint system is durable in construction, inexpensive to manufacture, carefree of maintenance, easy to assemble, and simple and effective in use.

These and other objects, features and advantages are accomplished according to the instant invention by providing a supplemental restraint system that is mountable to the frame of a stationary structure, such as a police station or other building, to secure a prisoner in a seated position. The supplemental restraint system includes a restraint bar that is pivotally supported on the mounting plate for movement between a raised inoperative position and a lowered operative position. A locking mechanism secures the restraint bar in any selected lowered position and includes an actuation lever for selectively releasing the locking mechanism to permit the restraint bar to be raised for release of the prisoner. A spring mechanism biases the restraint bar toward a raised position so that the restraint bar can be moved upwardly while the police officer is outside of the police vehicle. Mounting plates can be utilized to secure the supplemental restraint system to the floor structure and an adjacent wall structure.

BRIEF DESCRIPTION OF THE DRAWINGS

The foregoing and other objects, features, and advantages of the invention will appear more fully hereinafter from a consideration of the detailed description that follows, in conjunction with the accompanying sheets of drawings. It is to be expressly understood, however, that the drawings are for illustrative purposes and are not to be construed as defining the limits of the invention.

FIG. 6 is a right side elevational view of the supplemental restraint mechanism with the restraint bar being lowered into an operative position;

FIG. 7 is a right side elevational view of the supplemental restraint mechanism shown in FIG. 6, but with the restraint bar raised into an inoperative position;

FIG. 12 is a schematic front perspective view of the supplemental restraint system with the restraint bar elevated into a raised position in order to receive a person in custody onto the seat thereof;

FIG. 13 is a schematic front perspective view of the supplemental restraint system as depicted in FIG. 12 but with a representative person in custody placed on the seat; and FIG. 14 is a schematic front perspective view of the supplemental restraint system as depicted in FIG. 13, but with the restraint bar lowered into the operative position to restrain the person in custody on the seat.

DETAILED DESCRIPTION OF THE PREFERRED EMBODIMENT

Figure 1:
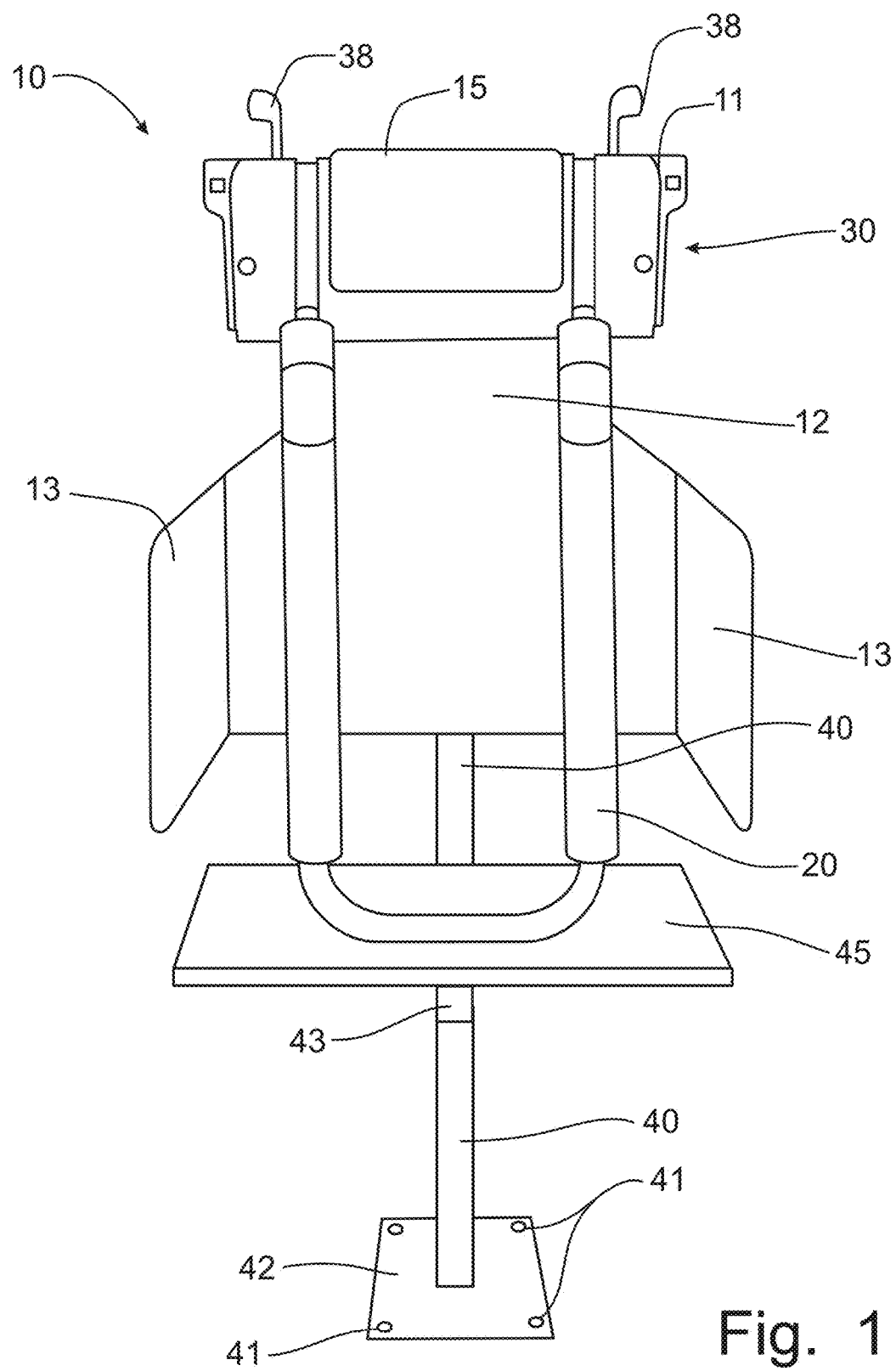
FIG. 1 is a front perspective view of the supplemental restraint system incorporating the principles of the instant invention, the restraint bar being lowered to the operative position.

Referring to the drawings, a supplemental restraint system for the restraint of a prisoner or person in custody at a stationary structure, such as a police station or other building structure, and incorporating the principles of the instant invention, can best be seen. Any references to left, right, forward or rearward are determined by standing in front of the supplemental restraint mechanism and looking at the forward face thereof with the rearward side facing the wall of the building structure.

As noted in the parent application granted as U.S. Pat. No. 9,340,180, the supplemental restraint mechanism 10 can be adapted to be added to any existing police vehicle (not shown) or to be incorporated into the construction of the molded plastic rear seat structure so that the supplemental restraint mechanism 10 can be part of the original equipment when the molded rear seat structure is installed into a police vehicle. However, the supplemental restraint mechanism 10 can be supported on a support stand 40, which in turn can be secured to the building structure, such as a wall 48 and floor 49 of the building structure through mounting brackets 42 to provide a safe and secure apparatus to restraint a person in custody at a police station or other appropriate building structure.

The primary frame 11 of the supplemental restraint mechanism 10 includes a back plate 12 that extends downwardly from the frame 11 to provide a back rest for the person in custody. The back plate 12 is affixed to the support stand 40, which is preferably angled at about fifteen degrees from vertical to provide a slightly reclined orientation to the mechanism 10, so as to be an integral part thereof. The back plate 12 is a formed member that includes side restraints 13 that are bent forwardly from the back plate 12 to prevent the person in custody from moving very far laterally. Below the back plate 12, a seat frame 43 projects forwardly from the support stand 40 preferably perpendicularly thereto for supporting a seat plate 45 affixed to the top of the seat frame 43. One skilled in the art will recognize that the structure shown in the drawings is intended to represent the formed components of the supplemental restraint mechanism 10 and that appropriate padding would be added to the seat plate 45, the back plate 12 and the side restraints 13 to provide a safe environment for the temporary restraint of a person in custody.

The supplemental restraint mechanism 10 includes a locking mechanism 30 supported on the mounting plate 12 and covered by a contoured cover 15 to keep the locking mechanism 30 secured. Preferably, the front side of the mounting plate 12 and the cover 15 are covered by a padding (not shown) for the comfort of the prisoner being transported.

Figure 9:
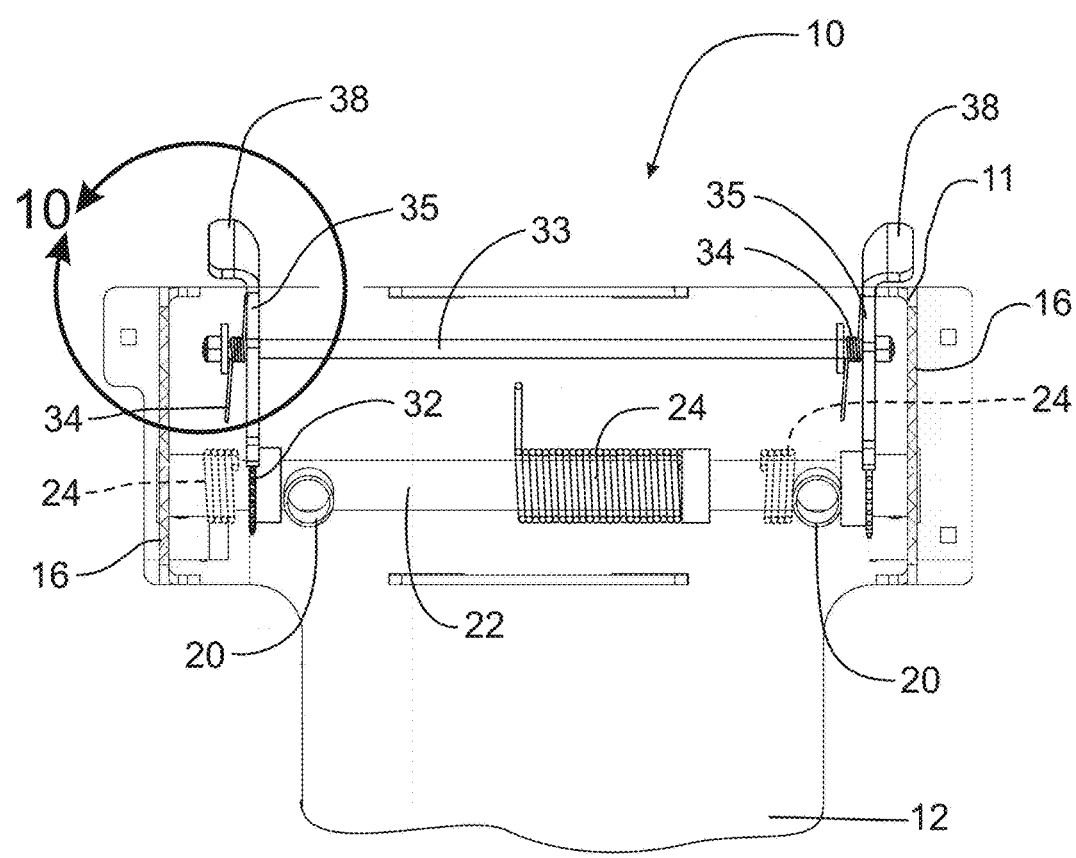
FIG. 9 is an enlarged front elevational view of the locking mechanism, the cover and restraint bar being removed for purposes of clarity.
Figure 10:
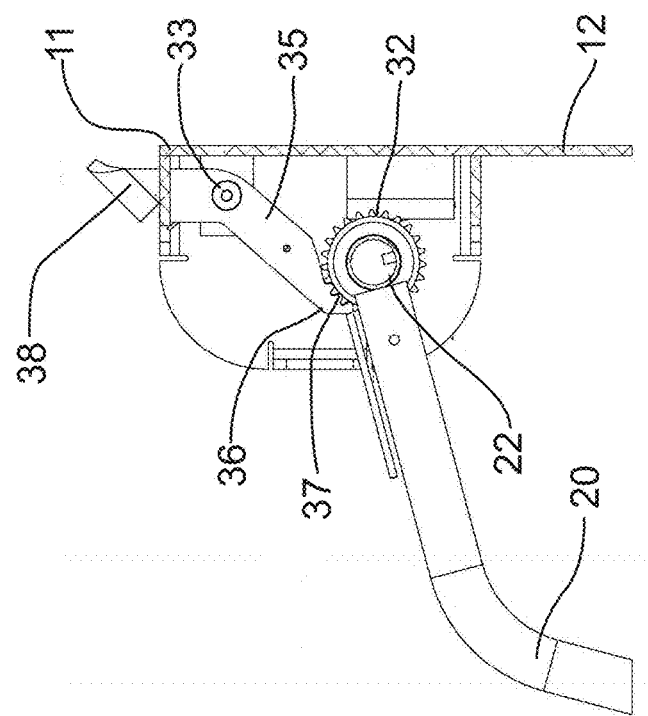
FIG. 10; is an enlarged detail view showing the front elevational view of the release latch corresponding to circle 10 of FIG. 9.
Figure 11:
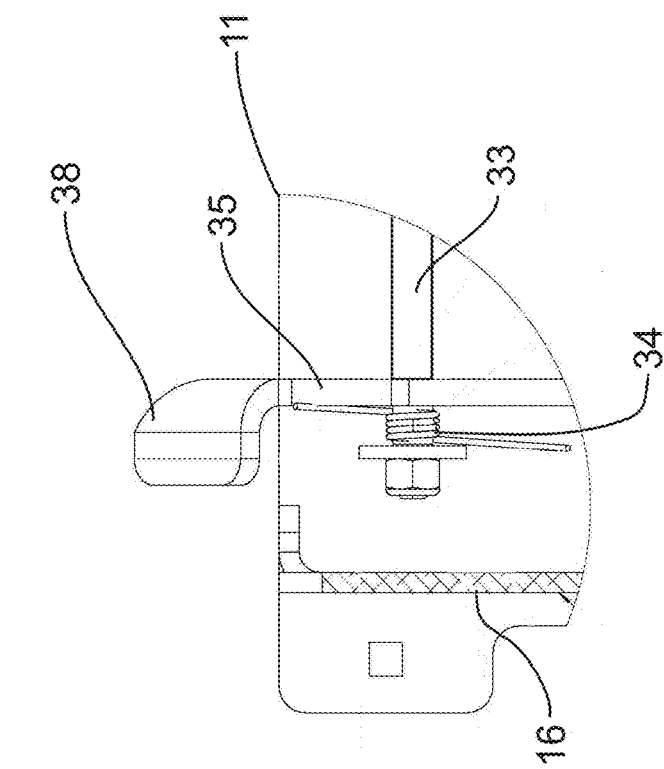
FIG. 11 is an enlarged left side elevational view of the locking mechanism shown in FIG. 9.

The supplemental restraint mechanism 10 further includes a curved restraint bar 20 that is mounted to a pivot shaft 22 journaled for rotation on the side walls 16 of the frame 11 so that the restraint bar 20 can move between a lowered operative position depicted in FIG. 6 and a raised inoperative position depicted in FIG. 7. When the restraint bar 20 is placed into the raised inoperative position, the prisoner can be placed into the seat followed by the manual lowering of the restraint bar 20 into the lowered operative position to secure the seated positioning of the prisoner. The pivot shaft 22 is coupled to a pair of torsion springs 24, which can be mounted on the opposing sides of the pivot shaft 22 proximate to the respective side walls 16 of the frame 11 or mounted on the pivot shaft 22 as depicted in FIG. 9. The torsion springs 24 are secured to the pivot shaft 22 and to the frame 11 so that the lowering of the restraint bar 20 to the operative position results in the torsion springs 24 exerting an increased biasing force that urges the pivot shaft 22 to rotate in a manner that will move the attached restraint bar 20 toward the raised inoperative position.

The pivot shaft 22 is also formed with a pair of sprockets 32 affixed to opposing ends of the pivot shaft 22 so as to be rotatable with the pivot shaft 22. The locking mechanism 30 further includes a corresponding pair of release levers 35 that are pivotally mounted on the frame 11 about a rock shaft 33. The rock shaft 33 interconnects the opposing release levers 35 so that the movement of one release lever 35 results in the movement of both release levers 35. Each of the release levers 35 includes a ratchet end 36 that is formed with ramped teeth 37 that are engagable with the corresponding sprocket 32. The ramped teeth 37 allow the sprocket 32 to rotate while engaged with the ratchet end 36, but only if the restraint bar 20 is being moved from the raised inoperative position toward the lowered operative position. The ramped teeth 37 prevent the upward movement of the restraint bar 20 when the ratchet end 36 is engaged with the sprocket 32. At least one torsion spring 34 is mounted on the rock shaft 33 and interconnects the frame 11 and the release lever 35 or rock shaft 33 to urge the ratchet end 36 into engagement with the sprocket 32.

The upper end of each release lever 35 is formed as an actuation tab 38 that projects above the cover 15 for ease of engagement. The actuation tab 38 is on the opposite side of the rock shaft 33 from the ratchet end 36 so that a manual depressing of one of the actuation tabs 38 against the bias exerted by the torsion spring 34 results in a pivotal movement of both of the release levers 35 about the rock shaft 33 to raise the ratchet end 36 out of engagement with the sprocket 32. The disengagement of the ratchet end 36 from the sprocket 32 allows the torsion springs 24 to move the restraint bar 20 toward the raised inoperative position.

Figure 2:
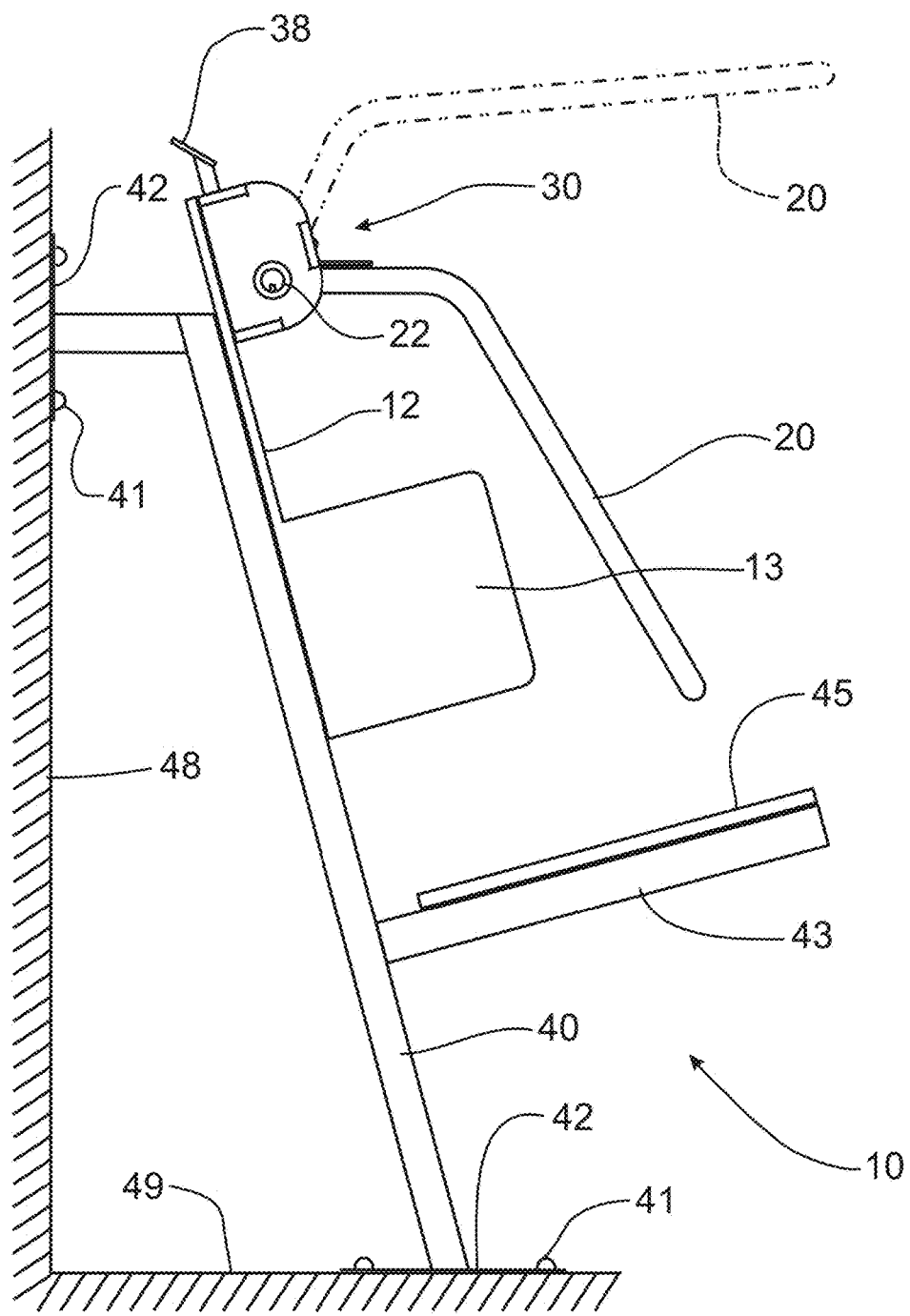
FIG. 2 is a side elevational view of the supplemental restraint system shown in FIG. 1, the movement of the restraint bar into the raised release position being shown in phantom.
Figure 3:
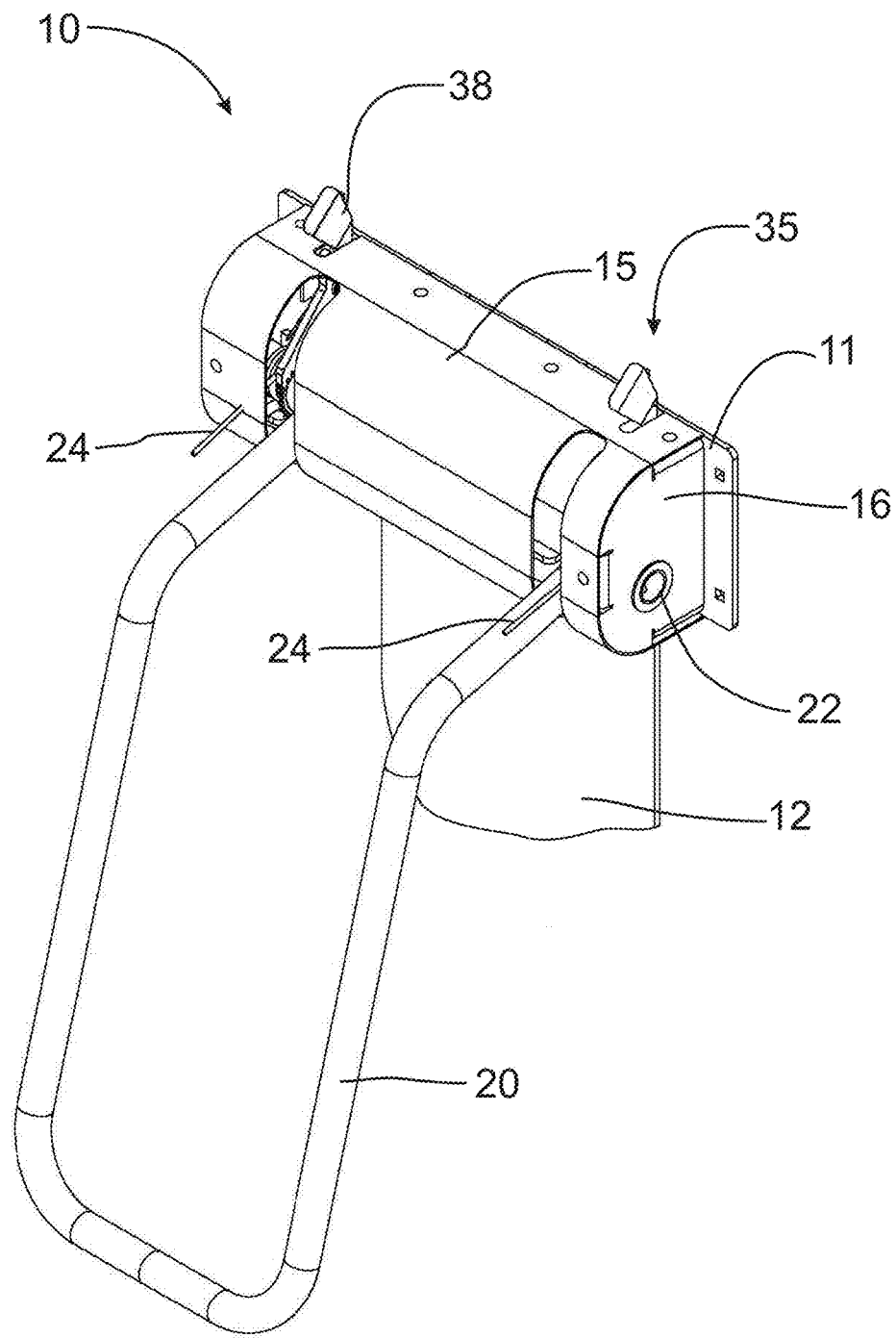
FIG. 3 is a left front perspective view of the supplemental restraint mechanism incorporating the principles of the instant invention, the restraint bar being lowered into a lowered operative position.
Figure 4:
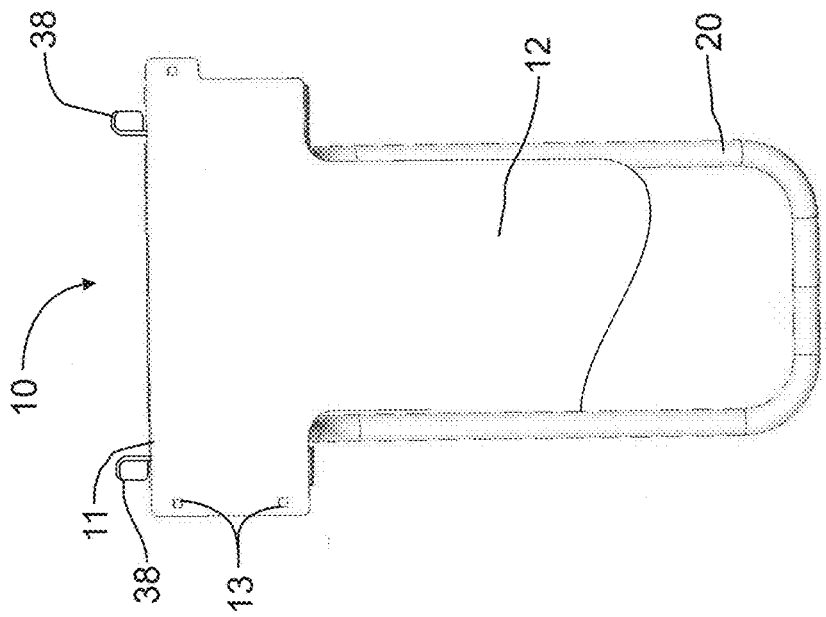
FIG. 4 is front elevational view of the supplemental restraint mechanism shown in FIG. 3.
Figure 5:
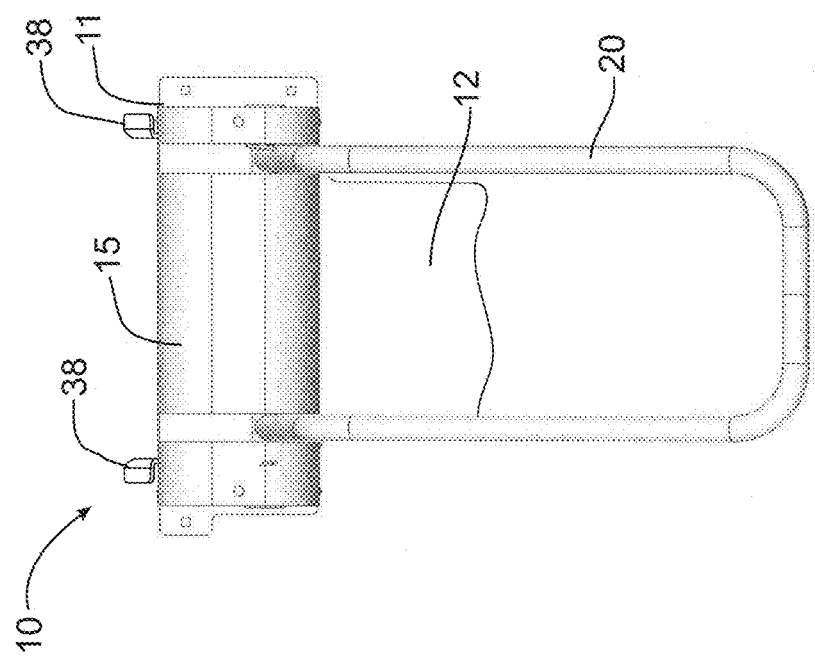
FIG. 5 is a rear elevational view of the supplemental restraint mechanism shown in FIG. 3.
Figure 8:
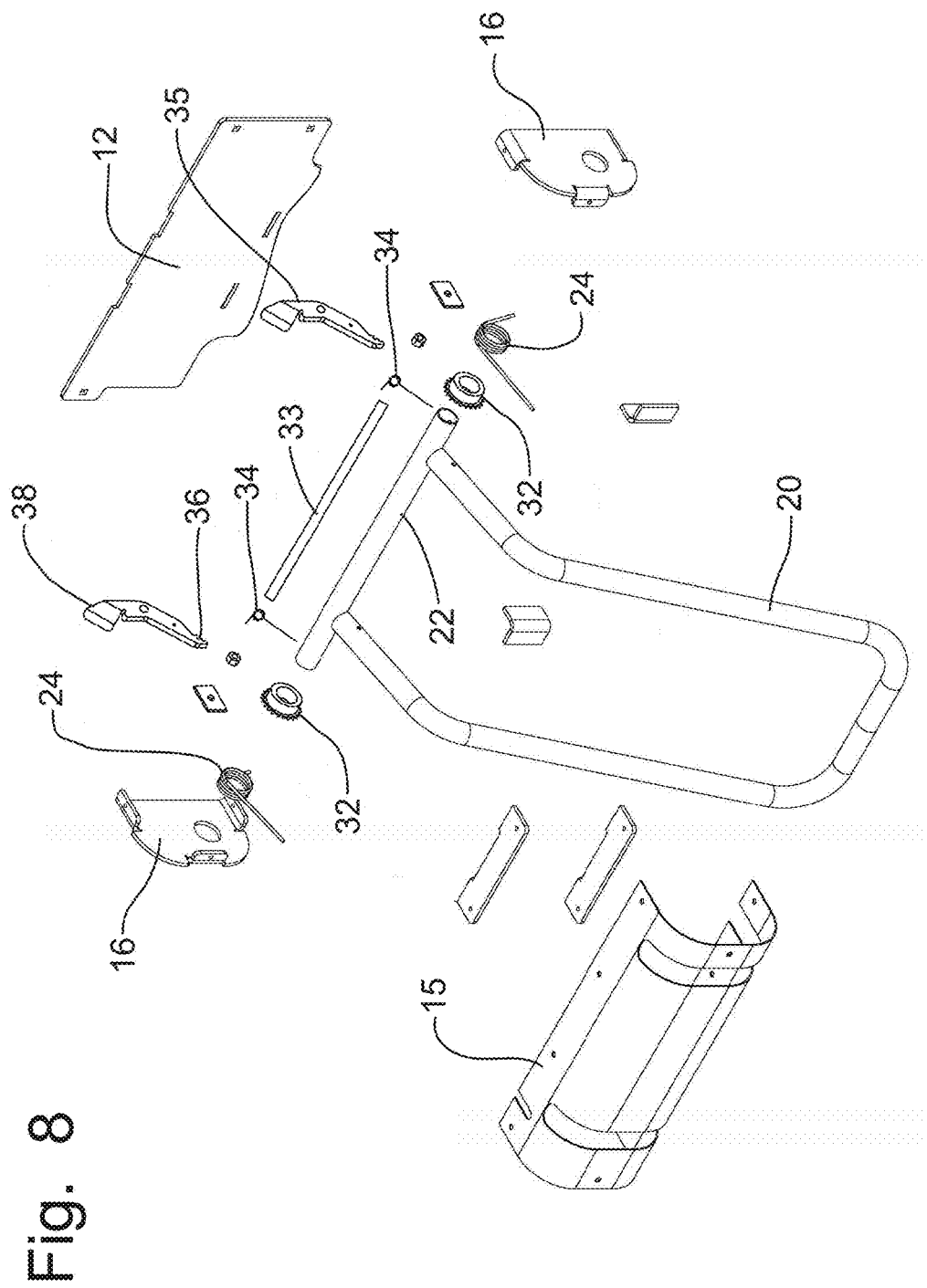
FIG. 8 is a right, front perspective exploded view of the supplemental restraint mechanism.

In operation, the supplemental restraint system 10 is mounted in place within a stationary structure, such as a police station building, by securing the mounting brackets 42 by fasteners 41 that engage the frame of the building so as to be immovable relative to the building structure. The wall mounting bracket 42 preferably extends horizontally from the support stand 40 and is secured to the wall 48, while the floor mounting bracket 42 is similarly affixed to the floor structure 49. With the support stand 40 angled at about fifteen degrees to vertical, the seat plate 45 is also angled upwardly, as best seen in FIG. 2, to keep the weight of the person in custody in a reclined position against the back plate 12.

As best seen in FIGS. 12-14, the restraint bar 20 is raised to the inoperative position, shown in FIG. 12, so that the person in custody can be eased onto the seat plate 45 and reclined against the back plate 12, as is depicted in FIG. 13. The person in custody can then be restrained by lowering the restraint bar 20 to the lowered operative position, as depicted in FIG. 14. As noted above, the restraint bar 20 can be lowered into an appropriate lowered operative position appropriate commensurate to the size of the person in custody to temporarily secure the seated position of the prisoner while paperwork is being processed, or for other reasons for which the prisoner requires temporary restraint. With the hands of the prisoner restrained, such as through the use of handcuffs, the prisoner cannot reach the actuation tabs 38 to enable the possible upward movement of the restraint bar 20.

To release the prisoner from the supplemental restraint system 10, the police officer need only reach to the actuation tab 38 at the top of the cover 15 on the side of the restraint mechanism 10. By depressing the actuation tab 38 rearwardly, the ratchet end 36 is released from the sprocket 32 allowing the torsion springs 24 to raise the restraint bar 20 toward the raised inoperative position, whereupon, the prisoner is able to move off of the seat plate 45.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiments of the invention; however, concepts, as based upon the description, may be employed in other embodiments without departing from the scope of the invention. The invention is not otherwise limited, except for the recitation of the claims set forth below.

Having thus described the invention, what is claimed is:
1. A supplemental restraint system for restraining a prisoner on a seating device, comprising:
 a support stand;
 a seat member affixed to said support stand;
 a back plate affixed to said support stand above said seat member;
 a pivot shaft mounted on said support stand above said seat member for movement about a generally horizontal axis;
 a restraint bar mounted on said pivot shaft for movement therewith from an upper inoperative position to a lower restraining position; and
 a locking mechanism operatively connected to said pivot shaft to lock said restraint bar in said lower restraining position, said locking mechanism including a release member that disengages said locking mechanism to permit selective movement of said restraining bar to said upper inoperative position, said release member including a pivoted release lever having a ratchet end engagable with a sprocket carried on said pivot shaft and being rotatable therewith as said restraint bar moves between said upper inoperative position and said lower restraining position.

2. The supplemental restraint system of claim 1 wherein said support stand is coupled to mounting brackets for mounting to a stationary building structure.

3. The supplemental restraint system of claim 1 wherein said support stand is oriented at an acute angle from vertical to establish a reclined seating orientation for a person seated on said seat member.

4. The supplemental restraint system of claim 1 wherein said seat member comprises:
   a seat frame member affixed to said support stand generally orthogonally thereto; and
   a seat plate affixed to a top surface of said seat frame member.

5. The supplemental restraint system of claim 1 wherein said pivot shaft is coupled to a first torsion spring to bias said restraint bar toward said upper inoperative position.

6. The supplemental restraint system of claim 5 wherein said release lever is coupled to a second torsion spring to bias said ratchet end into engagement with said sprocket.

7. The supplemental restraint system of claim 6 wherein said locking mechanism includes a release lever on both opposing sides of said locking mechanism, said release levers being interconnected by a rock shaft so that the movement of one of said release levers results in simultaneous movement of both said release levers.

8. The supplemental restraint system of claim 7 wherein said release levers prevent the upward movement of said restraint bar from any lower restraining position.

9. The supplemental restraint system of claim 8 wherein said ratchet end of said release lever is formed with a plurality of ramped teeth that are engaged with said sprocket, said ramped teeth permitting said sprocket to rotate in one direction of rotation against said ramped teeth, but preventing said sprocket from rotating in an opposite direction of rotation.

10. A stationary restraint apparatus for restraining a person in custody at a static structure having a generally vertical wall and a generally horizontal floor, comprising:
   a support stand having a floor mounting bracket at a lower end thereof for securing said support stand to said floor, and a wall mounting bracket at an upper end for securing said support stand to said wall;
   a seat member affixed to said support stand and extending forwardly of said support stand for supporting said person in custody;
   a back member affixed to said support stand above said seat member to provide a back rest for support of said person in custody; and
   a restraint mechanism supported on said support stand above said seat member and including:
      a pivot shaft supported on said support stand above said seat member for movement about a generally horizontal axis;
      a restraint bar mounted on said pivot shaft for pivotal movement therewith from an upper inoperative position to a lower restraining position; and
      a locking mechanism operatively associated with said pivot shaft to lock said restraint bar in said lower restraining position, said locking mechanism including a pair of opposing release levers that disengage said locking mechanism to permit selective movement of said restraining bar to said upper inoperative position, each said release lever including a ratchet end formed with a plurality of ramped teeth that are engaged with corresponding sprockets carried on said pivot shaft, said ramped teeth permitting said sprocket to rotate in one direction of rotation against said ramped teeth, but preventing said sprocket from rotating in an opposite direction of rotation, said opposing release levers being interconnected by a rock shaft.

11. The stationary restraint apparatus of claim 10 wherein said support stand is reclined at an acute angle to vertical from said floor mounting bracket toward said wall.

12. The stationary restraint apparatus of claim 11 wherein said seat member is affixed generally perpendicularly to said support stand to provide a reclined orientation for said person in custody positioned on said seat member.

13. The stationary restraint apparatus of claim 12 wherein said back member comprises:
   a generally planar back plate portion affixed to said support stand; and
   a side restraint extending laterally and forwardly from each lateral side of said back plate to restrict lateral movement of a person in custody.

14. The stationary restraint apparatus of claim 11 wherein said acute angle is approximately fifteen degrees.

15. The stationary restraint apparatus of claim 10 wherein said pivot shaft is coupled to a first torsion spring to bias said restraint bar toward said upper inoperative position, said release lever being coupled to a second torsion spring to bias said ratchet end into engagement with said sprocket.

16. The stationary restraint apparatus of claim 15 wherein said release levers prevent the upward movement of said restraint bar from any lower restraining position.

17. A stationary restraint apparatus for restraining a person in custody at a static structure having a generally vertical wall and a generally horizontal floor, comprising:
   a support stand having a floor mounting bracket at a lower end thereof for securing said support stand to said floor, and a wall mounting bracket at an upper end for securing said support stand to said wall, said support stand being inclined at an acute angle from vertical from said floor mounting bracket toward said wall mounting bracket;
   a seat member affixed to said support stand generally perpendicularly thereto, said seat member extending forwardly of said support stand for supporting said person in custody in a reclined position;
   a back member affixed to said support stand above said seat member to provide a back rest for support of said person in custody, said back member including a generally planar back plate and a pair of side restraint members projecting forwardly from said back plate, said side restraint members having a lateral spacing that limits lateral movement of said person in custody positioned on said seat member; and
   a restraint mechanism supported on said support stand above said seat member and including:
      a pivot shaft supported on said support stand above said seat member for movement about a generally horizontal axis;
      a restraint bar mounted on said pivot shaft for pivotal movement therewith from an upper inoperative position to a lower restraining position; and
      a locking mechanism operatively associated with said pivot shaft to lock said restraint bar in said lower restraining position, said locking mechanism including a release mechanism that disengages said locking mechanism to permit selective movement of said restraining bar to said upper inoperative position.

18. The stationary restraint apparatus of claim 17 wherein said release mechanism includes a pair of release levers located on opposing lateral sides of said restraint mechanism, each said release lever including a ratchet end formed with a plurality of ramped teeth that are engaged with corresponding sprockets carried on said pivot shaft, said ramped teeth permitting said sprocket to rotate in one direction of rotation against said ramped teeth, but preventing said sprocket from rotating in an opposite direction of rotation.

19. The stationary restraint apparatus of claim 18 wherein the engagement of said release levers with said locking mechanism prevents the upward movement of said restraint bar from any lowered operative position.

\* \* \* \* \*